US005501762A

United States Patent [19]

Marschke et al.

[11] Patent Number: 5,501,762

[45] Date of Patent: Mar. 26, 1996

[54] HOT PLATE FOR CORRUGATED PAPERBOARD DOUBLE FACER

[75] Inventors: Carl R. Marschke, Phillips; Larry M. Krznarich, Park Falls, both of Wis.

[73] Assignee: Marquip, Inc., Phillips, Wis.

[21] Appl. No.: 255,159

[22] Filed: Jun. 7, 1994

[51] Int. Cl.$^{6}$ .............................. B31F 1/20; B32B 31/26

[52] U.S. Cl. ........................ 156/470; 156/499; 156/583.5; 165/168

[58] Field of Search .................................... 156/470, 499, 156/583.5; 165/168, 170, 171; 219/388, 401, 402

[56] References Cited

U.S. PATENT DOCUMENTS

| | | | |
|---|---|---|---|
| 3,175,300 | 3/1965 | Nitchie | 156/470 |
| 3,413,176 | 11/1968 | Port et al. | 156/499 |
| 4,212,348 | 7/1980 | Kobayashi | 165/171 |
| 4,478,277 | 10/1984 | Friedman et al. | 165/170 |
| 4,479,048 | 10/1984 | Kinoshita | 219/388 |
| 5,096,408 | 3/1992 | Bielfeldt | 156/583.5 |
| 5,156,714 | 10/1992 | Thomas | 156/499 |
| 5,183,525 | 2/1993 | Thomas | 156/470 |
| 5,244,518 | 9/1993 | Krayenhagen et al. | 156/64 |
| 5,263,538 | 11/1993 | Amidieu et al. | 165/170 |

*Primary Examiner*—Michele K. Yoder
*Attorney, Agent, or Firm*—Andrus, Sceales, Starke & Sawall

[57] ABSTRACT

A hot plate for a double facer used in the manufacture of corrugated paperboard includes a substantially all copper construction which enhances thermal conductivity and heat transfer efficiency. Steam for heating the plates is provided through an array of copper tubes extending between manifolds on opposite sides of the hot plate, all in a manner which obviates the need for heavy pressure vessel construction. The hot plate is allowed to float on its supporting frame in a manner which accommodates lateral thermal expansion, and the lateral ends are tied vertically to the supporting frame to prevent thermal bowing characteristic of prior art systems.

11 Claims, 2 Drawing Sheets

FIG. 3
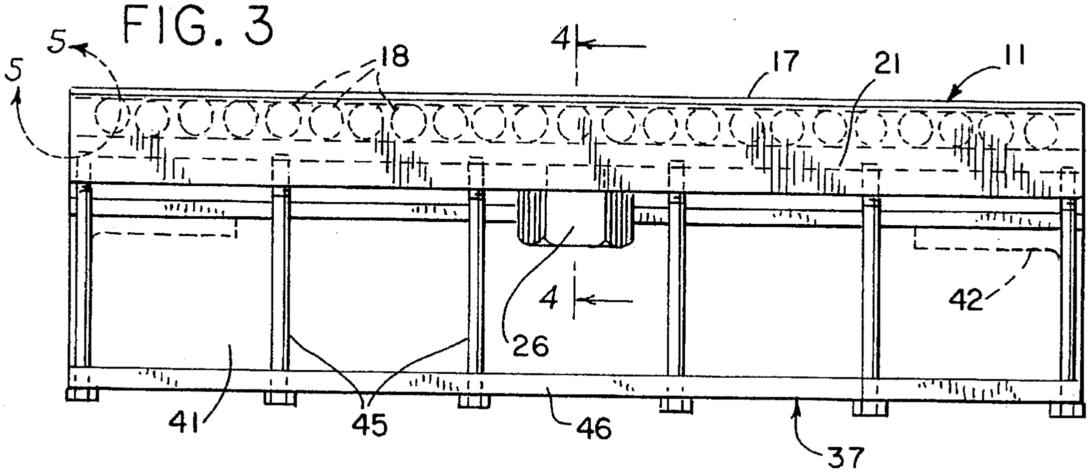
FIG. 4
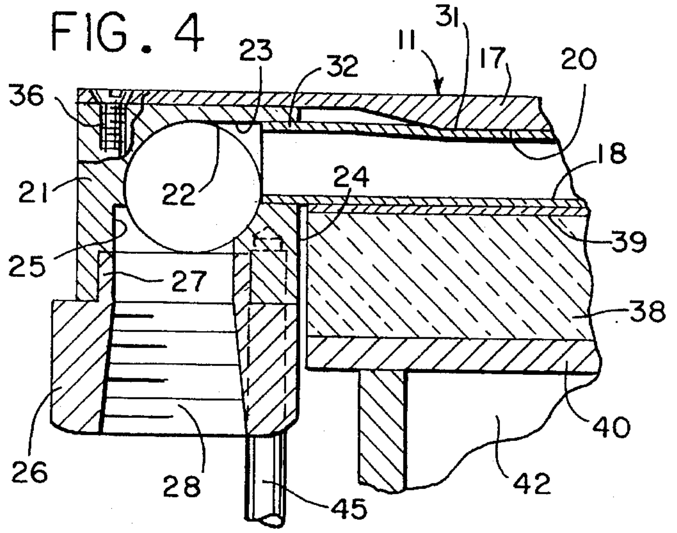
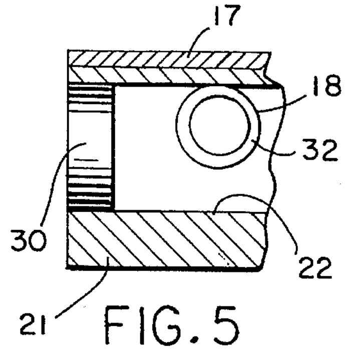
FIG. 5
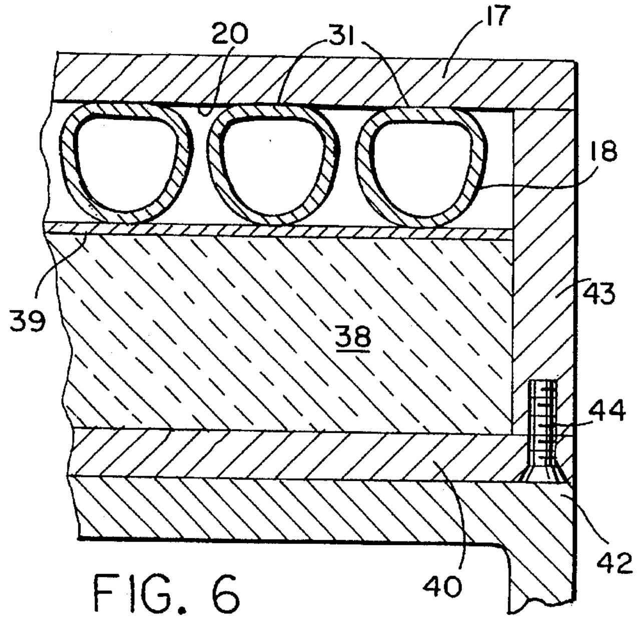
FIG. 6
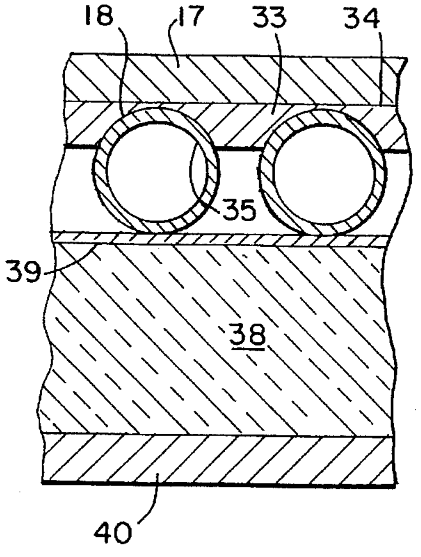
FIG. 7

HOT PLATE FOR CORRUGATED PAPERBOARD DOUBLE FACER

BACKGROUND OF THE INVENTION

The present invention relates to an apparatus for the manufacture of corrugated paperboard and, more particularly, to a heating apparatus for a double facer where a single web is attached to a single face corrugated web.

In a typical prior art double facer, a single web is brought into contact with the glued flute tips of a single face corrugated web and the freshly glued double face web is passed over the surfaces of a number of serially arranged steam chests to cause the starch-based glue to set. Double face web travel over the steam chests is provided by a wide driven holddown belt in direct contact with the upper face of the corrugated web and the top face of the belt held in contact with the traveling web by a series of ballast rollers or the like, all in a well known manner.

Prior art steam chests, one example of which is shown in U.S. Pat. No. 3,175,300, are typically made of heavy cast iron construction in the manner of a pressure vessel in order to contain the high pressure steam which is supplied to the steam chest. For example, the walls of a cast iron steam chest are typically 1" or more thick to safely contain superheated steam supplied, for example, at 350° F. and 160 psi. A steam chest has a flat upper web-supporting surface having a length in a transverse direction sufficient to support the full width of the traveling web and a width in the direction of web movement of typically about 18" to 24". Eighteen steam chests are typically serially arranged in closely spaced relation in a double facer.

The heavy cast iron construction of prior art steam chests results in a number of well known operational problems. The heavy walled construction of these steam chests requires a long time to bring them up to temperature on startup. Eventually, the steam chest may be brought close to the temperature of the steam being supplied to it. However, when operation is commenced and the double face corrugated web is traveling over the upper surfaces of the steam chests, heat is drawn therefrom at a rapid rate and maximum surface temperature may drop to levels as low as 220°–230° F. This lower effective operating temperature may require the use of a substantially larger number of steam chests in a given double facer than would be necessary if more efficient heat transfer were attainable. Another problem directly related to the inefficiency of heat transfer through a heavy iron steam chest casting is the transverse bowing of the upper surface of a conventional steam chest during operation. As indicated, the temperature of the flat upper wall of the steam chest is reduced substantially relative to the bottom wall of the steam chest resulting in a concave bowing of the upper surface lengthwise of the steam chest (transversely across the web traveling thereover). As a result, the holddown belt and transverse ballast rollers pushing the belt downwardly against the upper surface of the web do not impose a uniform load on the web. The result may be uneven curing of the adhesive, zones of poor or no adhesion, and crushing of the lateral edges of the web. Finally, the heavy mass of cast iron steam chests results in high heat retention and slow cool down, often requiring elaborate systems to lift the web or lower the steam chests to avoid excess heating of the web.

U.S. Pat. No. 5,183,525 includes a recognition of certain of the foregoing operational problems in systems utilizing heavy cast iron steam chests. In this patent, the steam chest is replaced by a heavy steel plate through which transverse horizontal bores are drilled and interconnected at their opposite lateral ends to form a serpentine steam passage through the plate. The holes may be drilled in a manner forming a much thinner web of material between the bores and the upper surface of the plate to increase the efficiency of heat transfer. The patent also teaches that the problem of bowing or distortion of the upper contacting face of the plate is minimized. However, the construction of the heating plates in this patent is still quite massive and heavy and, as is well known, the heat transfer efficiency of ferrous metals is relatively poor.

There remains a need, therefore, for a simple, efficient, and low cost hot plate system for a double facer which effectively addresses the problems typical of the prior art.

SUMMARY OF THE INVENTION

In accordance with the present invention, a hot plate for supporting and heating the moving web of corrugated paperboard in a double facer includes a web supporting top plate made of a metal, such as copper, having a high heat transfer efficiency (high thermal conductivity), a series of spaced generally parallel tubes extending below the plate transversely to the direction of web travel and positioned in a planar array in operative heat conducting contact with the underside of the top plate, a pair of manifolds each connecting the open ends of the tubes along one lateral edge of the top plate, a source of a heated fluid operatively connected to the manifolds, and means for transferring the heated fluid through the tubes between the manifolds. The apparatus also includes a lower supporting frame which has a bottom plate that underlies the top plate in parallel vertical spaced relation, anchoring means that rigidly interconnect the top plate and the bottom plate midway between the manifolds, and vertical holddown means which interconnect the manifolds to the lateral outer edges of the supporting frame in a manner which prevents vertical movement of the lateral edges of the top plate, but allows horizontal lateral movement thereof as a result of thermal expansion.

In a preferred construction, a layer of insulation is placed between the bottom plate and the tubes which underlie the top plate. Preferably, a thin metal sheet is interposed between and in contact with the insulating layer and the tube array.

The entire heat transfer portion of the hot plate of the present invention, including the top plate, the tubes, and the manifolds, is preferably constructed of copper. Brazed connections are provided between the tube ends and the manifolds and the heating fluid is superheated high pressure steam.

The steam carrying tubes are, at least initially, circular in cross section, but are provided with a flat operative heat conducting contact surface between each tube and the overlying top plate. The flat contact surface preferably comprises a flattened surface segment along the tube between the manifolds. Alternately, the flat contact surface may comprise a spacer plate which has a flat upper surface in contact with the underside of the top plate and a corrugated lower surface which conforms to the cross sectional shape of the array of tubes.

The upper surface of the copper top plate which supports the web is clad with a wear resistant material, preferably hard chrome plating.

BRIEF DESCRIPTION OF THE DRAWINGS

FIG. 3 is a side elevation of the hot plate shown in FIG. 2.

FIG. 4 is a sectional detail taken on line 4—4 of FIG. 3.

FIG. 5 is an enlarged sectional detail of a portion of FIG. 3.

FIG. 6 is a sectional detail taken on line 6—6 of FIG. 2.

FIG. 7 is a sectional detail similar to FIG. 6 showing an alternate construction.

DETAILED DESCRIPTION OF THE PREFERRED EMBODIMENTS

Figure 1:
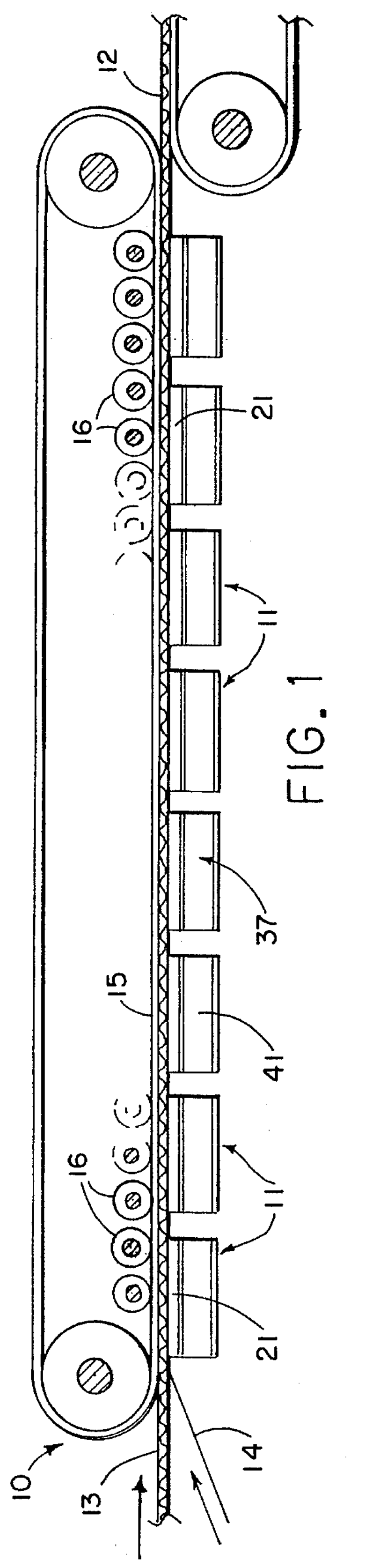
FIG. 1 is a generally schematic side elevation of a double backer utilizing the hot plates of the subject invention.

Referring first to FIG. 1, a double facer 10 of conventional construction is shown schematically and includes a series of hot plates 11 constructed in accordance with the subject invention. Each of the hot plates 11 is identically constructed and performs the same heating function in the manufacture of a double face corrugated web 12 as is provided by prior art steam chests, described above. Thus, the hot plates 11 provide a flat, substantially continuous heated surface over which the double face web (formed by joining a single face corrugated web 13 and a liner web 14) is conveyed by a holddown belt 15 which is pressed down against the web 12 by a series of ballast rollers 16.

Figure 2:
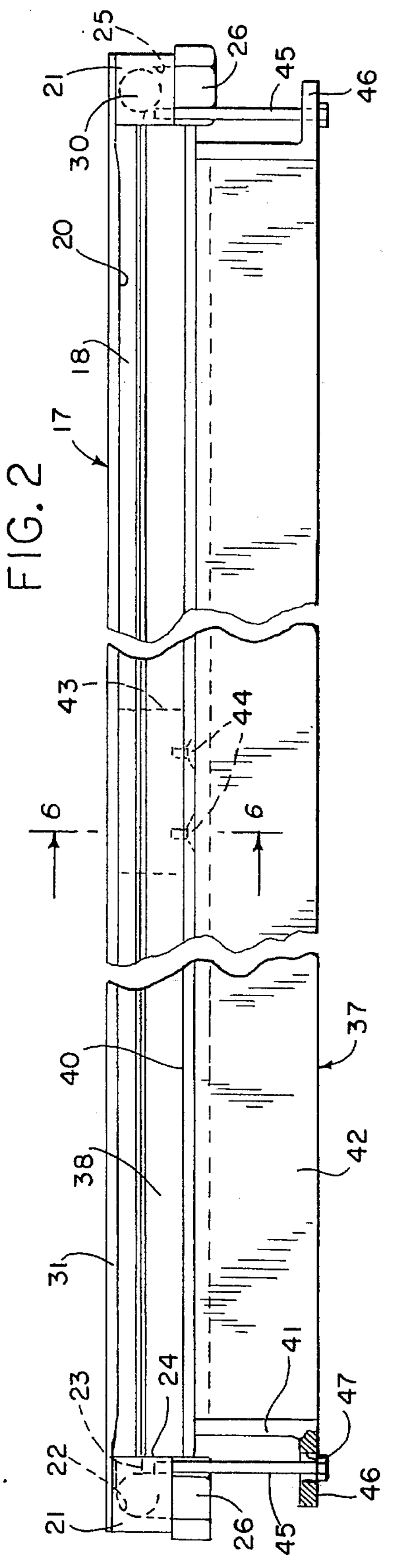
FIG. 2 is an end elevation, partly in section, of a hot plate of the subject invention.

Referring also to FIGS. 2 and 3, each of the hot plates 11 includes a top plate 17 made of a metal having a thermal conductivity substantially higher than that provided by ferrous metals. Preferably, the top plate 17 is made of copper and may be ¼" thick. The higher thermal conductivity and substantially thinner section both contribute to the ability to transfer heat more efficiently from the inside of the hot plate 11 to the outer surface in contact with the moving double face web 12. A series of spaced generally parallel open-ended copper tubes 18 are positioned in a generally planar array beneath and in operative heat conducting contact with the underside 20 of the top plate 17. The array of tubes conforms generally to the rectangular shape of the top plate 17 which typically has a length in the direction transverse to web movement just slightly greater than the width of the web and a top plate width in the direction of web movement which is substantially shorter, typically about 18". Thus, to accommodate a web 12 of maximum width typically handled in a double facer 10, the hot plate 11 may have a length (in the cross machine direction) in excess of 8'.

The opposite ends of the tubes 18 and the lateral edges of the top plate 17 extend between and are attached to a pair of manifolds 21. Each of the manifolds 21 has a length equal to the width of the top plate 17 and has a generally square cross section. Each of the manifolds is preferably machined from a solid copper bar, although copper extrusions may also be utilized. Each manifold is provided with a longitudinal through bore 22 which, as indicated, may be drilled in solid bar stock or formed in the bar as part of an extrusion in process. A series of aligned cross bores 23 are formed in the inside face 24 of each manifold and are sized to receive the ends 32 of the copper tubes 18 therein. The cross bores 23 extend into open communication with the manifold through bore 22 and the joints are brazed to provide a high temperature fitting, such as with silver brazing material. A steam supply or condensate drain opening 25 is provided centrally in the lower face of each manifold 21. The opening 25 extends into the manifold through bore 22 and may be tapped to receive the threaded sleeve 27 of an adaptor union 26. The lower interior end of the union 26 is provided with a conventional pipe thread adapted to receive the threaded end of a steam supply pipe (not shown). The opening 25 in the other manifold would be connected to a condensate return line (also not shown). Steam supplied to the manifold 21 is distributed along the through bore 22 into and through each of the tubes 18 to the manifold on the opposite side of the hot plate. As shown in FIG. 5, the ends of the through bore 22 are sealed with appropriate plugs 30.

Referring also to FIGS. 6 and 7, to enhance heat transfer from the copper tubes 18 to the copper top plate 17, the upper surfaces of the tubes 18 are provided with flattened segments 31 which extend nearly the full lengths of the tubes and provide enhanced surface contact between the tubes and the underside 20 of the top plate. The brazed tube ends 32 (FIG. 5) remain circular in cross section. Alternately, the enhanced surface contact between the tubes and the top plate may be provided by a specially shaped spacer plate 33 which has a flat upper surface 34 in flush contact with the underside 20 of the top plate and a corrugated lower surface 35 which conforms to and intimately contacts the outside upper surfaces of the tubes. To assist in maintaining the positions of the tubes relative to the top plate and to add strength and rigidity to the overall structure, the flattened surface segments 31 are preferably coated with a solder paste prior to placement of the top plate over the tubes and the subassembly is then baked to set the solder. Similarly, baked solder paste interfaces could be provided between the spacer plate 33 and the top plate and tubes, respectively. The lateral edges of the top plate 17 are secured to the respective manifolds 21 with a series of machine screws 36 (FIG. 4).

The entire hot plate subassembly comprising the top plate 17, tubes 18 and manifolds 21, is mounted on a lower supporting frame 37 in a manner to permit unrestricted lateral thermal expansion, but to restrict vertical upward bowing of the lateral edges, as described above. First of all, the underside of the steam carrying tubes 18 is insulated from the lower supporting frame 37 by an insulating layer 38 which is preferably separated from direct contact with the tubes by a thin copper sheet 39 of, for example, 0.030 inch thickness. The insulating layer 38 rests on a flat metal bottom plate 40 which also defines the upper surface of the supporting frame 37. The bottom plate 40 may, for example, comprise a 1/4" rectangular steel plate of approximately the same area as the underside of the hot plate. The bottom plate 40, in turn, rests on a box-like frame constructed from a pair of L-shaped side angle members 41 interconnected by a pair of inverted L-shaped cross members 42. The L-shaped angle members 41 and cross members 42 may be suitably connected with welds or any other convenient mechanism and the bottom plate 40 is similarly secured to the upper edges or faces of said members. Referring particularly to FIGS. 2 and 6, the copper top plate 17 is fastened to the bottom plate 40 midway between the manifolds with a pair of anchor plates 43 located at the respective forward and rearward edges of the hot plate. Each anchor plate 43 is secured at its lower edge to the upper face of the bottom plate 40 by a pair of machine screws 44 and the top edge of the anchor plate is soldered to the underside 20 of the top plate 17.

To prevent the lateral edges of the hot plate 11 from bowing upwardly in use as a result of differential thermal expansions, both edges of the hot plate are secured to the horizontal flange 46 of the L-shaped side members 41 by a series of tie bolts 45 threaded into the lower surface of the manifold 21. As is shown in FIG. 2, the bolt holes 47 in the horizontal flange 46 are elongated in the lateral or cross machine direction to accommodate lateral thermal elongation of the hot plate 11 while holding the top plate edges from upward bowing.

The use of an essentially all copper construction in the fabrication of hot plates 11 of the present invention provides a number of distinct advantages. First of all, the high heat conductivity and heat transfer efficiency allows the hot plates to be brought to operating temperature more quickly on startup, to keep the board contacting upper surfaces at a substantially higher temperature during operation than prior art ferrous metal steam chests, and allows the hot plates to cool down more rapidly when the supply of steam is shutoff. The hot plate support system allows unrestricted lateral thermal expansion of the hot plate, but prevents adverse upward bowing of the lateral edges, resulting in a paperboard web supporting surface which can be maintained more nearly horizontal across the full width of the double facer. The high heat transfer efficiency provided by the hot plates 11 of this invention may allow the use of fewer hot plates than prior art double facers with iron or steel steam chests.

To minimize wear of the board supporting top surface of the hot plates 11, the top surfaces of the top plates 17 are provided with a wear resistant material. Preferably, the wear resistant surface material is a hard chrome plating.

Various modes of carrying out the present invention are contemplated as being within the scope of the following claims particularly pointing out and distinctly claiming the subject matter which is regarded as the invention.

We claim:

1. A hot plate for supporting and heating a traveling web of corrugated paperboard in a double facer comprising:

a web supporting top plate made of a non-ferrous metal having a high thermal conductivity;

a series of spaced generally parallel open-ended non-ferrous metal tubes extending transverse to the direction of web travel, positioned in a planar array beneath and in operative heat conducting contact with the underside of said top plate;

a pair of manifolds attached to the top plate, each manifold connecting the open ends of the tubes along one lateral edge of the top plate;

a source of a heated fluid operatively connected to said manifolds;

means for transferring the heated fluid through said tubes between the manifolds;

a lower steel supporting frame including a bottom plate adapted to underlie said top plate in parallel vertical spaced relation thereto;

anchoring means rigidly interconnecting the top plate and said bottom plate midway between said manifolds; and, vertical holddown means connecting the manifolds to the lateral outer edges of the supporting frame for preventing upward bowing of the top plate caused by thermally induced vertical. movement of the lateral edges of the top plate and for allowing horizontal lateral movement thereof caused by thermal expansion of the top plate in opposite directions from said anchoring means.

2. The apparatus as set forth in claim 1 wherein said bottom plate is spaced vertically below said tubes and further including a layer of insulation between said bottom plate and said tubes.

3. The apparatus as set forth in claim 2 including a thin metal sheet interposed between and in contact with said insulation layer and said tubes.

4. The apparatus as set forth in claim 1 wherein said top plate, the tubes, and the manifolds are made from copper.

5. The apparatus as set forth in claim 1 including brazed connections between said tube ends and the manifolds.

6. The apparatus as set forth in claim 5 wherein said heated fluid is steam.

7. The apparatus as set forth in claim 1 wherein said tubes are circular in cross section, and including a flat operative heat conducting contact surface between each tube and said top plate.

8. The apparatus as set forth in claim 7 wherein said flat contact surface comprises a flattened surface segment along the tube between the manifolds.

9. The apparatus as set forth in claim 7 wherein said flat contact surface comprises a spacer plate having a flat upper surface contacting the underside of said top plate and a corrugated lower surface conforming to the cross sectional shape of said series of tubes.

10. The apparatus as set forth in claim 4 wherein the top web-supporting surface of the top plate is clad with a wear resistant material.

11. The apparatus as set forth in claim 10 wherein the top surface of said top plate is hard chrome plated.

* * * * *